United States Patent [19]

Harschel

[11] 4,023,305
[45] May 17, 1977

[54] DEVICE TO REMOVE EXCESS WATER FROM PLANT CONTAINERS

[76] Inventor: Jonas C. Harschel, 8 Mariposa Court, Burlingame, Calif. 94010

[22] Filed: Mar. 5, 1975

[21] Appl. No.: 555,542

[52] U.S. Cl. .................. 47/81; 33/13; 99/346; 137/150; 141/65; 222/377; 428/43
[51] Int. Cl.² .............. A01G 9/02; A01G 27/00
[58] Field of Search ............ 47/38, 1.2, 48.5, 34.1, 47/34.3, 34.R; 33/13; 220/63 R; 428/43; 206/820; 277/DIG. 10; 137/150; 141/65, 21, 18; 222/256, 377, 386.5; 99/346

[56] References Cited

UNITED STATES PATENTS

| | | | |
|---|---|---|---|
| 216,808 | 6/1879 | Schrader | 47/38 X |
| 515,032 | 2/1894 | Vestal | 47/34 |
| 979,170 | 12/1910 | Koharu | 137/150 |
| 982,283 | 1/1911 | McKee | 141/21 X |
| 1,213,331 | 1/1917 | Burleigh | 47/38 |
| 1,238,356 | 8/1917 | Stokes | 206/820 X |
| 1,742,684 | 1/1930 | Bowman | 33/13 |
| 1,941,859 | 1/1934 | Hall | 137/150 |
| 1,958,829 | 5/1934 | Lewin, Jr. | 428/43 |
| 1,978,025 | 10/1934 | McCown | 222/386.5 UX |
| 2,188,875 | 1/1940 | Ellis | 47/1.2 |
| 2,249,197 | 7/1941 | Brundin | 47/38 X |
| 2,268,592 | 1/1942 | Hothersall | 222/256 X |
| 2,445,717 | 7/1948 | Richards | 47/38 |
| 3,143,208 | 8/1964 | Sizemore, Jr. | 428/43 |
| 3,414,131 | 12/1968 | Allen, Jr. | 141/65 X |
| 3,547,752 | 12/1970 | Janssen | 428/43 |
| 3,604,150 | 9/1971 | Baumann | 47/38 X |

FOREIGN PATENTS OR APPLICATIONS

| | | | |
|---|---|---|---|
| 649,875 | 10/1962 | Canada | 222/256 |
| 684,106 | 6/1930 | France | 277/DIG 10 |
| 1,806,518 | 5/1970 | Germany | 47/1.2 |
| 1,801,268 | 5/1970 | Germany | 47/48.5 |
| 6,711,673 | 2/1968 | Netherlands | 47/38 |
| 352,482 | 7/1931 | United Kingdom | 47/38 |

Primary Examiner—Edgar S. Burr
Assistant Examiner—Steven A. Bratlie
Attorney, Agent, or Firm—Julian Caplan

[57] ABSTRACT

Prior to planting, a disc or plate is installed in the bottom of a container. The disc is porous or has a series of slits in various patterns to permit the disc to be trimmed to proper size to fit various sizes and shapes of containers, preferably with an upward curl near the sides. Shallow grooves in the top surface facilitate bending the curl. The slits also permit drainage of water without permitting dirt to enter the space below the disc. Slits in the bottom supplement the top slits and facilitate trimming and drainage. The bottom of the disc has legs which space the disc above the bottom of the container. At different spacings from the center are shallow cups having detachable bottoms. When the disc is in place, a tube is pushed through the outermost cup, pushing out the bottom so that the bottom end of the tube extends into the space below the disc. The top of the tube is cut off slightly above the surface of the soil in the container. In use, the plant in the container is watered until some water collects in the bottom space. Drainage is permitted for a sufficient time period. Excess water is removed by means of a squeeze bulb inserted in the top of the tube.

4 Claims, 9 Drawing Figures

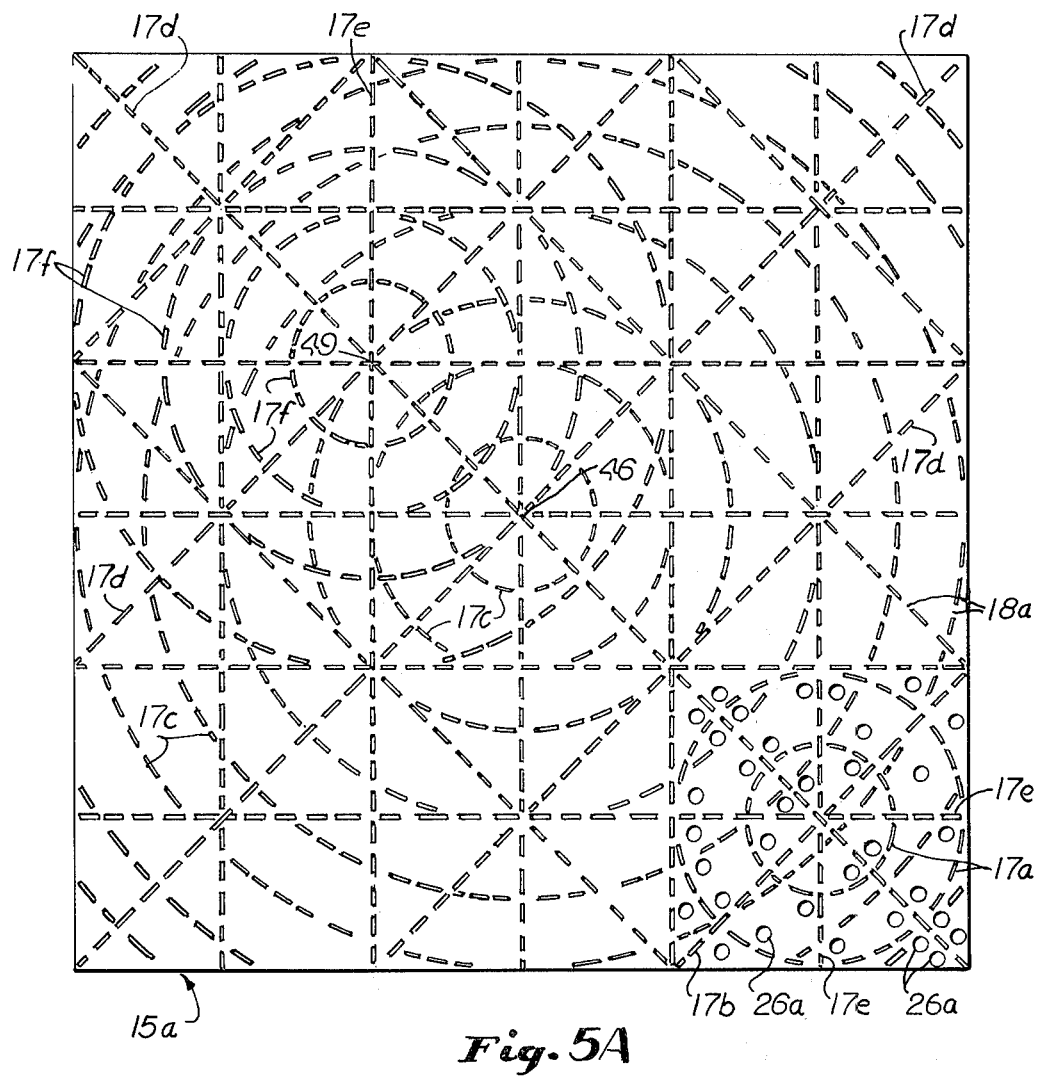
Fig. 5A
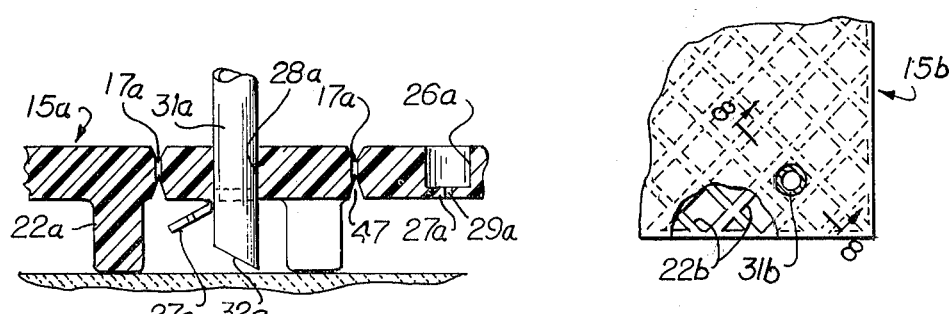
Fig. 6
Fig. 7
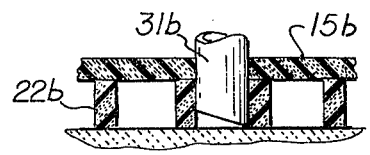
Fig. 8

DEVICE TO REMOVE EXCESS WATER FROM PLANT CONTAINERS

This invention relates to a new and improved device for removing excess water from plant containers. More particularly, the device is used in a plant container to determine when the plant has been sufficiently watered and to remove excess water.

Use of the present device prevents or reduces common household plant problems such as crown or root rot, mildew, poor air circulation and under and overwatering. The latter causes many of the leaf defects for plants such as wilting, brown spots, yellow spots and dry and brittle leaves. Further, flower buds drop and stems become soft when water is insufficient or excessive. The present device indicates when watering is sufficient and permits removal of excess water.

Another feature of the invention is that it permits use of containers not ordinarily used for plants because it is not necessary to have a drain at the bottom of the container and eliminates the need for drip saucers. Even baskets and metal containers, including copper, may be used provided a plastic liner is installed to avoid leakage and condensation.

Use of charcoal, crushed rock, pebbles or other drainage materials frequently used in drainless containers are unnecessary when the present device is used and the expedient of installing an inner pot inside an ornamental container is made unnecessary.

Thus, a particular feature and advantage of the present invention is the fact that the plant in the pot in which the device is installed is maintained in better condition than in conventional practice. The device is used to determine when the pot needs watering and when the soil is too damp.

Other objects of the present invention will become apparent upon reading the following specification and referring to the accompanying drawings in which similar characters of reference represent corresponding parts in each of the several views.

In the drawings:

FIG. 5A is a view similar to FIG. 2 of a modification.

FIG. 6 is an enlarged fragmentary sectional view through a portion of FIG. 5.

FIG. 7 is a fragmentary plan view, partly broken away in section of a further modification.

FIG. 8 is a fragmentary sectional view taken substantially along the line 8—8 of FIG. 7.

Figure 2:
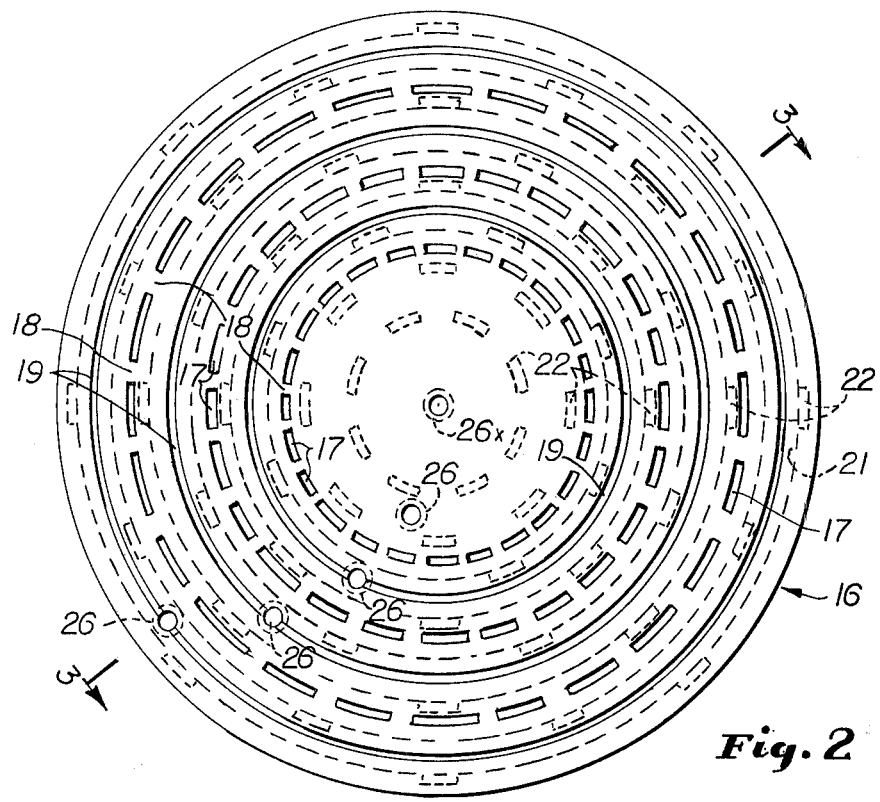
FIG. 2 is an enlarged top plan view of the disc used with the device.
Figure 3:
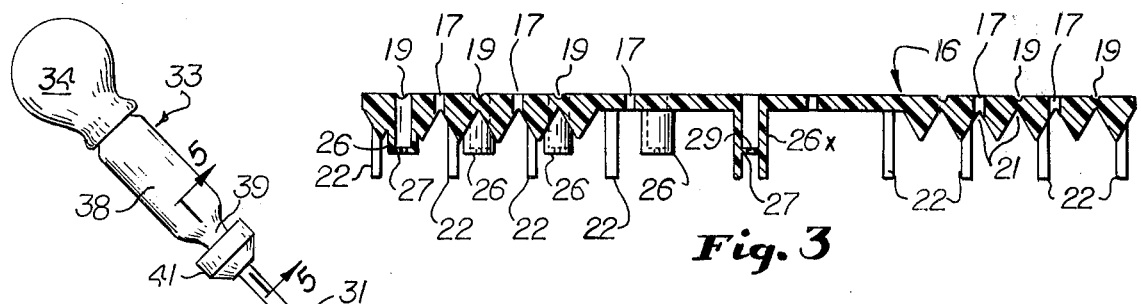
FIG. 3 is a sectional view taken substantially along the line 3—3 of FIG. 2.

The present invention is preferably used in a container 11 of conventional or even unconventional construction. Thus, container 11 may be an ordinary flower pot but may also be a bucket, cookie jar, pitcher, mug, watering can, basket, etc., and may be of a metal construction, even copper, provided a liner (not shown) is used inside the sides 12. The bottom 13 of the container need not, and preferably does not, have a drainage hole as in conventional flower pots.

A disc 16 preferably of a plastic material such as polysterene or polyethylene, is installed near the bottom 13 and soil 14 is placed above the disc 16 for a plant (not shown).

Disc 16 of FIG. 2 is preferably suitable for installation in pots 11 of different sizes and shapes. To enable the disc to be trimmed to size, a plurality of slits 17 is formed, the slits being spaced at different radii so that the short connections 18 between the slits may be broken by hand or by using a shears.

Figure 1:
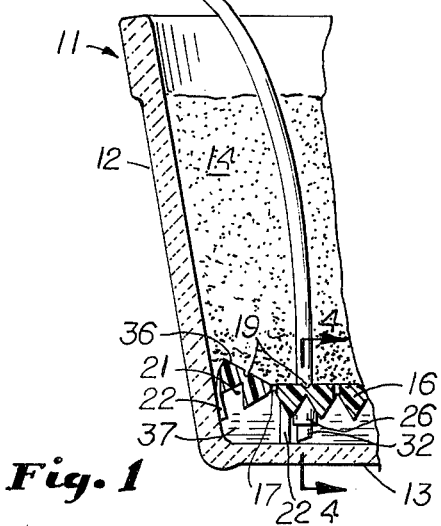
FIG. 1 is a fragmentary vertical sectional view through a container in which the device is installed.

In the accompanying drawings, slits 17 are illustrated in circular patterns to accommodate round containers. To accommodate rectangular containers, the pattern of slits may be rectangular (not shown in FIG. 2, but see FIG. 5A). Alternatively, both circular and rectangular slits may be formed. Shears may be used to cut irregular patterns or those not accommodated by slits 17. Further to facilitate trimming, deep bottom grooves 21 are formed in registry with slits 17. A series of top grooves 19 of different radii is formed to permit bending of the disc to the shape shown in FIG. 1. Legs 22 depend from the bottom of the disc 16 to space the disc above the bottom 13 as best shown in FIG. 1.

A plurality of shallow cups 26 having open tops flush with the top surface of disc 16 depend from the bottom and are spaced at differing distances from the center of the disc. As shown in FIG. 2, said cups are disposed in a spiral pattern but the particular pattern is a matter of choice. Preferably, each cup 26 is aligned with one of the grooves 19. The bottom 27 of each cup 26 is easily broken off leaving a hole 28 through which tube 31 extends. For drainage, a hole 29 is formed in each bottom 27. The central cup 26x is preferably elongated so that it functions as a leg.

A tube 31 having an outside diameter about equal to the inside diameter of cup 26 may be forced through the bottom 27 of the outermost cup 26 so that the bottom 32 of tube 31 extends into the space below the disc 16. The top of tube 31 is cut off so that it is slightly above the top of the pot 11. Adapter 41, formed of styrofoam or similar material, is slipped over the upper end of tube 31. Said adapter is formed at its upper end with a series of steps 42 of different diameters, diminishing downwardly. A syringe 33, such as a common kitchen basting syringe, is attached to adapter 41. Syringe 33 has a squeeze bulb 34 on its upper end, an enlarged transparent chamber 38 and a stem 39 below chamber 38. The steps 42 of adapter 41 accommodate different sizes of stems 39. Preferably, an adapter 41 is used for each pot 11 and a single syringe 33 (which may be used for kitchen purposes) is used from time to time when plants are being watered.

Figure 4:
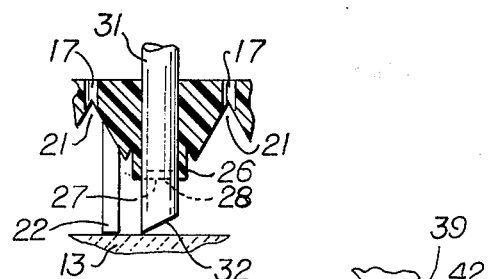
FIG. 4 is an enlarged fragmentary sectional view taken substantially along the line 4—4 of FIG. 1.
Figure 5:
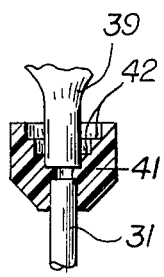
FIG. 5 is an enlarged fragmentary sectional view taken substantially along the line 5—5 of FIG. 1.

In use of the modification of FIG. 5A, a particular circle or rectangle of slits 17 may be selected slightly greater than the size of the bottom 13 and the connections 18 between the slits 17 are torn or cut away, leaving a disc of a diameter slightly greater than the bottom 13. The outer edge of the disc is bent upward, the grooves 19 facilitating the bending so that a slight curl 36 which extends partway up the side 12 results. Outermost leg 22 fits against side 12. The tube 31 is installed in the cup 26 closest to the side 12 and is forced through the bottom 27 so that it extends into the space below the disc 16. This position is best shown in FIG. 4. Tube 31 is cut to size and adapter 41 installed. Soil 14 and the plant itself are then added above the disc 16 in normal fashion.

From time to time as the plant is watered, the device is used to insure that adequate watering occurs and to remove excess water. If the top inch or so of soil 14 appears dry to the touch, tepid water is added to the soil surface. After a period of time sufficient for water to percolate through the soil and thence through the slits 17 has elapsed, the syringe 33 is inserted in adapter 41 and bulb 34 is squeezed and released several times. If water 37 has run through the perforations 17 in the disc 16 to the bottom 13 of the container, it will be sucked up into the transparent chamber 38 and can be observed. This indicates that sufficient water has been added. After a period of about one minute or more, the bulb is again squeezed and any excess water 37 which stands below the disc 16 is removed. In other words, the chamber 38 is filled with water and then disconnected from adapter 41 and discharged. The watering procedure is repeated whenever necessary.

Certain types of plants occasionally require the pot to be immersed in water. In such instances, the pot is soaked in a pail of water until bubbles stop rising to the surface and is then removed and drained. Using the same squeezing of the bulb 34 procedure set forth above, excess water is removed.

The modification of FIGS. 5A and 6 shows a simplified plate 15a which accommodates a wide variety of shapes of containers. The size of the plate 15a of FIG. 5A is preferably about 18 inches × 18 inches and it is divided into sections there being shown nine square sections, the lower right-hand section being illustrated in detail but it being understood that the other eight sections may be similarly or varyingly patterned. Directing attention to the lower right-hand section of FIG. 5A, it will be seen that there are two concentric circles of short slits 17a disposed about the center of the lower right-hand section and that there are also straightlines of perforations 17e dividing the section and diagonal lines 17b. About the center 46 of plate 15a are concentric circles of slits 17c of different diameters, and passing through the center 46 are diagonals 17d and additional parallel diagonals 17d. A center 49 may be selected in the upper two-thirds of plate 15a having a series of concentric circles 17f. In the bottom of plate 15a are grooves 47 which match the grooves 17a–17f so that there are drainage holes throughout the plate 15a permitting the passage of water, but these holes are fine enough to inhibit the passage of dirt. The lines 17a–17f are not continuous but are interrupted, there being enough material between the perforations to give the plate 15a strength. However, the perforations are sufficiently deep to permit bending or curling of the edges as shown by reference numeral 36 in FIG. 1. The perforations 17a–17f and 47 are sufficiently deep, and the spaces 18a between perforations are sufficiently short, so that instead of using shears, the plates 15a may be torn in the desired pattern by pulling apart on the perforations 17a, etc. with the fingers.

The patterns shown in FIG. 5A are merely representative. In the form shown in FIG. 5A, nine squares may be cut or torn out of the plate 15a to accommodate nine square 6 inch × 6 inch pots. Each square can be cut to accommodate a 6 inch diameter circle or a smaller diameter circle, the perforations 17a being used to guide the user in cutting the shapes. Alternatively, each square can be cut into four divisions using the lines 17e. Any two or more squares may be combined in a pattern. The diagonal lines may be used for triangular, hexagonal and other shapes. Using center 46, circular patterns (not shown) may be cut around the circles 17c larger than the circle 17a. The diagonals 17d may likewise be used.

If a single plate 15a is not large enough to fill the bottom of the container with which it is to be used, two or more such plates may be used, the adjoining edges being joined together, as by use of pressure-sensitive mending tape.

As best shown in FIG. 6, a plurality of feet 22a preferably formed integral with plate 15a depend from the bottom and space the plate from the bottom of the container. Similarly, cup-like depressions 26a corresponding to the cups 26 of the preceding modification are spaced apart in varying positions as shown in the pattern of FIG. 5A, each being provided with a drain hole 29a to prevent stagnation of water. The bottom 27a of any cup may be pushed out by the tube 31a as in the preceding modification.

Instead of perforating the plate, the plate may be made of a porous plastic material and the patterns of circles, squares, etc., may be applied by means of silk screening, printing, or other means.

In the modification of FIG. 7, a sheet of porous material 15b is provided which may be marked with circles, squares, etc. (not shown) in patterns such as shown in FIG. 5A. Sheet 15b is supported above the bottom of the container by a grid structure 22b which may be separate from, or integral with, sheet 15b. In the form shown in FIG. 7, the grid structure 22b is a reticulated pattern, but other shapes may be used. The function of structure 22b is to space sheet 15b above the container bottom for drainage. Tube 31b is inserted through sheet 15b and in a preferred form is of a size to fit between the walls of the grid with a reasonably tight fit.

What is claimed is:

1. A device for removing excess water from a plant container of the type having a bottom and a side wall above said bottom, said device comprising a substantially horizontal plate shaped to fit into said container, said plate being formed to permit water to drain through the plate but to retain soil from passing through the plate, a plurality of legs of approximately equal length depending below the bottom of said plate to engage said container to provide a space between said plate and the bottom of said container, a tube disposed inside said container for drawing water by suction from said space in said container below said plate, said tube extending inside said container through said plate from a bottom position below said plate to an upper position near the top of said container, a transparent syringe connected to the top of said tube and having a squeeze bulb for sucking water through said tube, said plate being formed with a cup having an inside diameter about equal to the outside diameter of said tube, said cup comprising a downward depression formed in said plate, said cup being formed with a detachable water-pervious bottom through which said tube extends, said plate being formed with a plurality of perforations arranged in a plurality of predetermined patterns throughout the plate, said plate being trimmed along selected ones of said perforations to provide one of said predetermined patterns to permit said plate to fit one of a plurality of sizes or shapes of containers.

2. A device according to claim 1 in which said plate has a center and is formed with grooves of different spacings from said center, said plate being formed of a material which may be curled to permit the portion of said plate remote from said center to be curled up to extend partially up said wall of said container.

3. A device according to claim 1 in which said plate is formed with a plurality of cups at different distances from the center of said plate, each said cup having a detachable bottom, whereby said tube may be inserted through any one of a plurality of said cups.

4. In combination, a plate according to claim 1, a container, said plate positioned near the bottom of said container and spaced above said bottom by said legs, soil in said container above said plate, said tube extending from below said plate to above said soil and operable from above said soil.

* * * * *